(12) United States Patent
Roys

(10) Patent No.: US 10,208,868 B2
(45) Date of Patent: Feb. 19, 2019

(54) FLUID DIVIDER BLOCK SUITABLE FOR USE AT HIGH PRESSURES

(71) Applicant: Compressor Products International LLC, Stafford, TX (US)

(72) Inventor: Curtis Roys, Midland, TX (US)

(73) Assignee: COMPRESSOR PRODUCTS INTERNATIONAL LLC, Stafford, TX (US)

( * ) Notice: Subject to any disclaimer, the term of this patent is extended or adjusted under 35 U.S.C. 154(b) by 0 days.

(21) Appl. No.: 14/944,820

(22) Filed: Nov. 18, 2015

(65) Prior Publication Data

US 2016/0186878 A1 Jun. 30, 2016

Related U.S. Application Data

(63) Continuation of application No. 14/053,718, filed on Oct. 15, 2013, now Pat. No. 9,212,781, which is a continuation of application No. 12/582,569, filed on Oct. 20, 2009, now Pat. No. 8,555,927, which is a continuation-in-part of application No. 11/405,383, filed on Apr. 17, 2006, which is a continuation of application No. 10/816,212, filed on Apr. 1, 2004, now Pat. No. 7,096,889.

(60) Provisional application No. 60/459,403, filed on Apr. 1, 2003.

(51) Int. Cl.
| | |
|---|---|
| *F16K 27/04* | (2006.01) |
| *F16K 27/00* | (2006.01) |
| *F16K 11/07* | (2006.01) |
| *F16N 25/02* | (2006.01) |
| *F16N 25/00* | (2006.01) |

(52) U.S. Cl.
CPC ............ *F16K 27/003* (2013.01); *F16K 11/07* (2013.01); *F16N 25/00* (2013.01); *F16N 25/02* (2013.01); *Y10T 29/49947* (2015.01); *Y10T 137/87885* (2015.04)

(58) Field of Classification Search
None
See application file for complete search history.

(56) References Cited

U.S. PATENT DOCUMENTS

| | | |
|---|---|---|
| 3,111,139 A | 11/1963 | Beckett et al. |
| 3,219,146 A | 11/1965 | Leese et al. |
| 3,298,460 A | 1/1967 | Porter et al. |
| 3,409,104 A | 11/1968 | Acker et al. |
| 3,515,245 A | 6/1970 | Obergefell et al. |
| 3,756,274 A | 9/1973 | Wolfgramm |
| 4,082,324 A | 4/1978 | Obrecht |
| 4,105,094 A | 8/1978 | Callahan |
| 4,186,821 A | 2/1980 | Wegmann |
| 4,312,425 A | 1/1982 | Snow et al. |
| 4,392,551 A | 7/1983 | Buryakov et al. |
| 4,502,567 A | 3/1985 | Karcher |
| 4,572,331 A | 2/1986 | Powell et al. |
| 5,285,871 A | 2/1994 | Sievenpiper |
| 5,605,179 A | 2/1997 | Strong et al. |

(Continued)

*Primary Examiner* — John Fox
(74) *Attorney, Agent, or Firm* — Perkins Coie LLP

(57) ABSTRACT

The invention is a divider block assembly suitable for use at high fluid pressures. Applicant has found that a sufficiently deep counterbored hole allows a mounting bolt to apply the sealing pressure well below the divider block surface, which can reduce or eliminate the compressive force on the metal around the piston bore, thereby reducing or eliminating distortion of the piston bore of the divider block and providing.

12 Claims, 12 Drawing Sheets

(56) References Cited

U.S. PATENT DOCUMENTS

| | | |
|---|---|---|
| 5,810,115 A | 9/1998 | Mismas |
| 5,835,372 A | 11/1998 | Roys et al. |
| 6,085,783 A | 7/2000 | Hollingshead |
| 6,850,849 B1 | 2/2005 | Roys |
| 6,986,407 B2 | 1/2006 | Conley et al. |
| 7,096,889 B1 | 8/2006 | Roys |
| 8,555,927 B2 | 10/2013 | Roys |

FLUID DIVIDER BLOCK SUITABLE FOR USE AT HIGH PRESSURES

This application is a continuation of U.S. application Ser. No. 14/053,718, filed Oct. 15, 2013, which is a continuation of U.S. application Ser. No. 12/582,569, filed on Oct. 20, 2009, and now U.S. Pat. No. 8,555,927, which is a continuation-in-part application of U.S. application Ser. No. 11/405,383, filed on Apr. 17, 2006, which is a continuation application of U.S. application Ser. No. 10/816,212, filed on Apr. 1, 2004 and now U.S. Pat. No. 7,096,889, which claims priority from U.S. Provisional Application No. 60/459,403, filed on Apr. 1, 2003, the entire contents of each of which are incorporated herein by reference.

TECHNICAL FIELD OF THE INVENTION

The present invention relates to high pressure, low volume fluid flow systems.

BACKGROUND OF THE INVENTION

Without adequate lubrication, industrial tools and machines such as compressors can be seriously damaged or destroyed. In many applications, a pump pressurizes a lubricant which is then distributed to multiple lubrication points using a device referred to as a "divider block" or "divider valve." In a divider block, the pressurized lubricant causes a set of pistons to move back and force in within piston bores, the moving pistons opening and closing internal fluids channels, so that a known volume of fluid is distributed to multiple outlet channels, once for every cycle of the group of cylinders. Because the pistons in the divider block are powered by the pressure of the fluid being distributed, no additional source of power is necessary to operate the divider block.

Divider blocks have been used to distribute lubricating oil to compressors for about fifty years, and they have changed little since their introduction. Because of the relative simplicity of divider blocks, users have been confident that divider blocks accurately distribute a fixed quantity of lubricant or other fluid to each outlet during each cycle of the divider block. When lubricated equipment fails, a technician will typically check to see that the divider block is cycling, and if it is, then assume that the equipment failure was not caused by a lack of lubrication. It has been observed that pistons within divider blocks occasionally wear out, but that is typically attributed to the large number of cycles and the close fit of the piston within the cylinder.

FIG. 1 shows the construction of a typical prior art divider block 100. Divider block 100 is built from multiple sections, including a base plate 102 and multiple divider block sections 104 mounted on the base plate 102. Each divider block section 104 includes an internal piston (not shown) within a bore (not shown). The base plate 102 is comprised of multiple sections, including an inlet section 108 connected to a pressurized fluid source (not shown), one or more intermediate base plate sections 110, and an end section 112. A divider block section 104 is mounted on each intermediate base plate section 110.

The inlet section 108, end section 112, and intermediate base plate sections 110 include internal channels (not shown) for fluid movement and holes for moving fluid between adjacent sections of base plate 102. Each intermediate base plate section 110 also includes an outlet (not shown) for dispensing the fluid, and holes for moving fluid in and out of the corresponding divider block sections 104.

Divider block sections 104 are typically available in a variety of bore sizes. Sizes are indicated as thousandth of a cubic inch displacement, such as sizes 6, 9, 12, 18, 24, and 30. In some divider blocks, inlet section 108 and/or the end section 112 are formed from a block that also includes an intermediate base plate. Additional intermediate base plate sections 110 can be inserted, along with corresponding divider block sections 102, to provide as many fluid outlets as necessary.

As shown in FIG. 1, each divider block section 104 is typically bolted to its corresponding intermediate base plate 110 using two bolts 120. The bolt holes are not positioned along a center line of the divider block section 104, because centered bolt holes would interfere with internal fluid passages. The bolt heads are typically recessed in a counterbore in the divider block section 104. The end section 112, inlet section 108, and intermediate base plates 110 are also bolted together using three bolts with threads on each end and a nut to tighten the manifold pieces together. Another design to bolt the inlet, intermediate and end section base plates 110 together uses hollow bolts with threads on the inside and outside, and solid bolts are inserted into the hollow bolts to manifold the intermediate and end sections together. The insert is threaded into one intermediate base plate 110, and then a bolt (not shown) through the next intermediate base plate 110 is threaded into the internal threads of the insert. This arrangement allows any number of intermediate base plates to be connected together.

FIG. 2 shows a base plate 102 including three intermediate base plate sections 110 without divider block sections 104. FIG. 2 shows holes 210 though which fluid passes between the base plate sections 110 and divider block sections 104, and threaded holes 212 for receiving mounting bolts 120 (FIG. 1). FIG. 3 shows a side view of a base plate 102 of FIG. 1, showing the three intermediate base sections 110, the input section 108, and the end section 112. Each intermediate base section 110 includes an outlet port 312. Outlet port 312 typically includes internal pipe threads so that an outlet pipe can screw directly into output port 312.

FIG. 4 shows a cross-section of a divider block section 104. Within a piston bore 400 is positioned a piston 402. Piston 402 typically includes two sections 404 of reduced diameter separating three sections 406 having a diameter that just fits within bore 400. Fluid can readily pass around sections 404, whereas fluid does not readily pass around sections 406, thereby allowing fluid pressure to move piston 402. The piston clearance within a piston bore is typically designed to be about 0.0003 inches (three ten-thousandths of an inch). A plug 408 is shown at one end of the bore 400. Bolt holes 410 are used for passage of bolts 120 that connect divider block section 402 to an intermediate base section 110, and indicator ports 412 are used to allow oil to either pass through the port from passage 414 or to be exposed in the port for trouble shooting purposes. FIG. 5 shows a front view of the divider block section 104 of FIG. 1. FIG. 5 shows bolt holes 410 and plugs 504 in indicator ports 412. FIG. 6 shows an end view of a divider block section 110 without plug 408, so piston 402 is visible in piston bore 400. This end view also shows the thin wall of metal above the piston, which is associated with failure of the piston to dispense accurate volumes of fluid in high pressure applications.

Over the years, industry has been experiencing unexplained equipment failures or reduced equipment life. Examination of the divider block used to lubricate the failed equipment often shows that the divider block is cycling properly, thereby leaving the cause of the failure a mystery.

SUMMARY OF THE INVENTION

An object of the invention is to provide a reliable divider block for use at high pressures.

Applicant has found that at high pressures, conventional divider blocks deform and may not accurately dispense the required volume of fluid. The pressure at which divider blocks operate has gradually increased over the years, and industry was unaware that as the pressure has increased, the accuracy of the volume of fluid dispensed by the divider blocks has decreased.

Applicant has found that with increased pressure, piston bores deform, and the pistons can fail to deliver the expected quantity of fluid, causing equipment failure or excess wear because of insufficient lubrication. Because the clearance of the piston within the bore is very small to prevent fluid from bypassing the piston, even a slight deformation of the bore can allow fluid to bypass the piston, thus reducing the amount of fluid delivered. Deformation of the bore can also cause the piston to chafe against a side of the bore, thereby causing premature wear of the piston. Because this problem was not recognized, divider blocks have not been designed to resist deformation.

The invention comprises a divider block that resists substantial deformation at high fluid pressures. Various embodiments can include a stronger housing with thicker walls surrounding the bore; the use of additional bolts to connect the divider block section to the intermediate base plates to prevent distortion and to distribute torque evenly to ensure sealing of the o-rings; strengthening the base section by increasing its physical size, that is, using more metal to form the inlet, intermediate and end sections; and using larger heat-treated tie rod bolts to assemble the base section to decrease flexing and ensure sealing of all o-rings; and carefully tightening all bolts to their proper torque to prevent deformation, and providing for the connecting bolts counterbores that are sufficiently deep that the force from the tightened bolts does not deform the piston bores, even if the bolts are over tightened. Not all of the measures are required for every application.

Applicant has also found that as the operating pressure increases, it becomes more important to balance the outlet pressures of the divider valve. When the outlet pressures are not balanced, pistons can move too rapidly, causing chaffing and premature wear. In accordance with another aspect of some embodiments of the invention, divider block outlets are pre-balanced using adjustable pressure valves that maintain a desired pressure at the outlets. In some embodiments, the divider block is designed to require balancing valves at each fluid outlet, unlike prior art divider blocks, which can typically be connected directly to an output pipe with or without a balancing valve.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed might be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, the following description is made with reference to the accompanying drawings, in which.

DETAILED DESCRIPTION OF THE PREFERRED EMBODIMENTS

Figure 1:
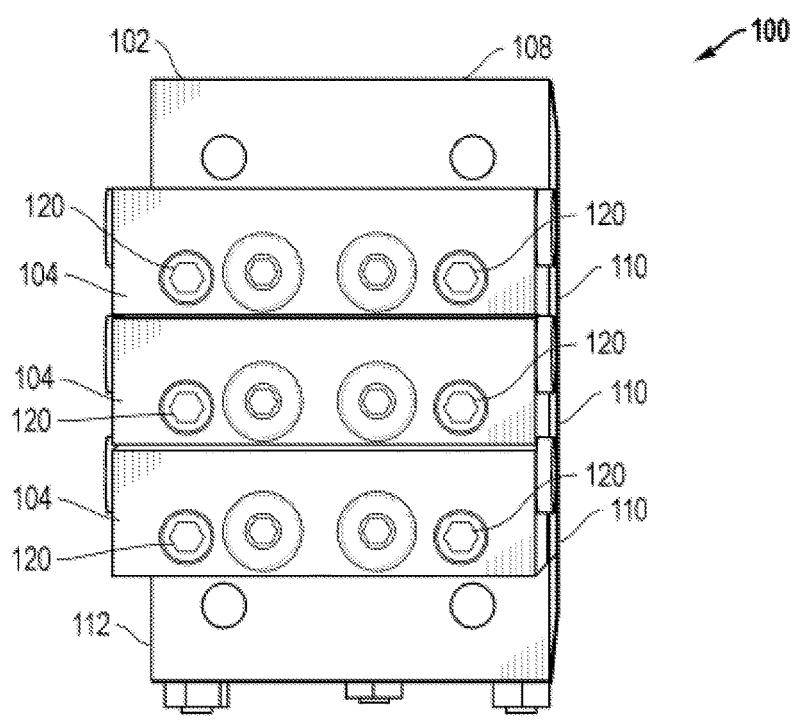
FIG. 1 is a front perspective view of a prior art divider block.
Figure 2:
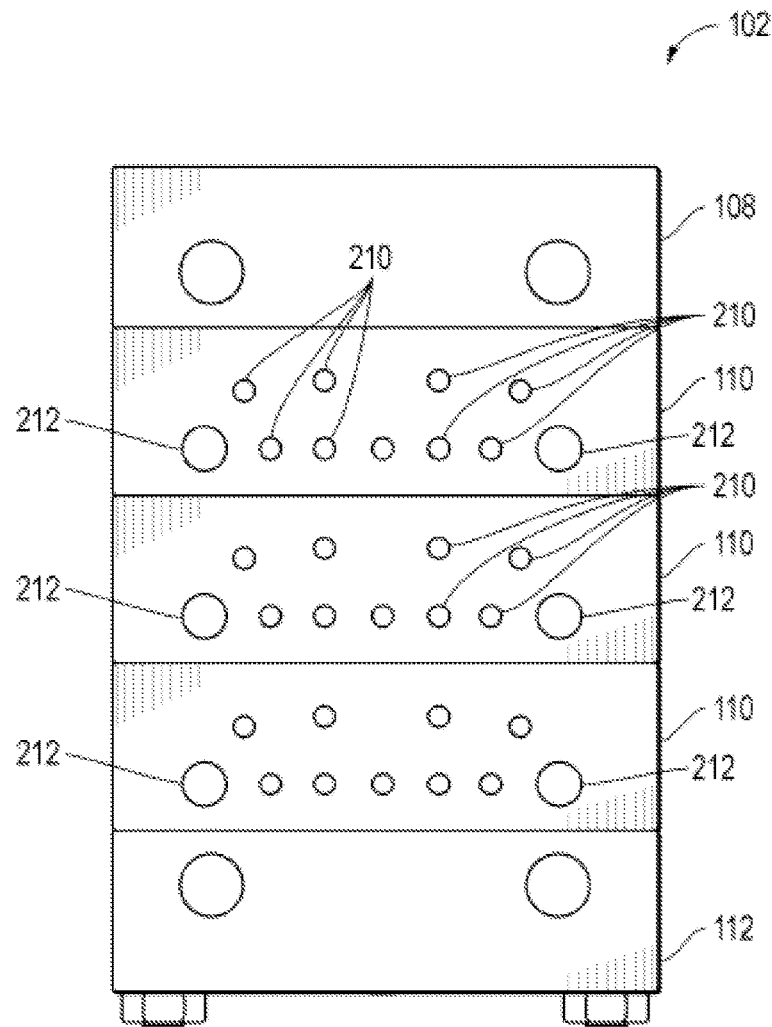
FIG. 2 is a front view of the base plate of the divider block of FIG. 1.

To investigate the problem of compressor failures when the divider block providing lubrication to the compressor appears to be cycling normally, applicant built a test stand to measure the volumes of fluid dispensed from several commercially available divider blocks at various pressures. Applicant monitored the number of cycles and the nominal output volume at working pressures of up to about 5000 psi using Proflo® monitors described in U.S. Pat. No. 5,835,372 and commercially available from CC Technology, Midland, Tex., the assignee of the present application. The Proflo® monitor measures the number of cycles of a divider block and can report and trend the output volume of the divider blocks at each outlet point while the system is operating at actual operating pressures. Applicant also measured the actual volume of fluid dispensed into an outlet path of the divider, using a single inlet, single outlet divider block located in the fluid outlet path downstream of the divider block under test. A single inlet, single outlet divider block is described in U.S. patent application Ser. No. 10/402,205, which is assigned to the assignee of the present invention and which is hereby incorporated by reference.

The results of applicant's tests were unexpected. Applicant found that the output volumes changed drastically at higher pressures. Applicant then determined that the change in output volume is caused by expansion of the piston bore under the high pressure. The expansion was found to be a significant fraction of the piston clearance. The clearance between the piston and bore of a typical divider block is about 0.0003 in. Applicant found that the stress of the high pressure caused the thin wall of the divider block bore to expand as much as 0.00017 in. This expansion allows the oil to leak around the piston to a lower pressure path, thereby changing the amount of fluid that is dispensed with each piston cycle and reducing the accuracy of the divider block.

in which "P" is the pressure in the cylinder in pounds per square inch (psi), "ID" is the inner diameter of the piston bore, and "t" is the thickness of the wall at the thinnest point;

$$\sigma = S/E,$$

in which E is the modulus of elasticity, which is equal to 31,443,675-34,909.64*T, with T being the temperature in degrees Fahrenheit; and $$\text{Expansion} = \sigma * ID.$$

TABLE 1

| Block Property | | Pressure | | | | |
| --- | --- | --- | --- | --- | --- | --- |
| | | 5000 | 4000 | 3000 | 2000 | 1000 |
| 6 | S (psi) | 4962.5 | 3970 | 2977.5 | 1985 | 992.5 |
| | σ (in/in) | 0.000197 | 0.000158 | 0.000118 | 7.89E−05 | 3.94E−05 |
| | Expansion | 0.350 | 0.280 | 0.210 | 0.140 | 0.070 |
| 9 | S | 5756.135 | 4604.908 | 3453.681 | 2302.454 | 1151.227 |
| | σ | 0.000229 | 0.000183 | 0.000137 | 9.15E−05 | 4.58E−05 |
| | Expansion | 0.486 | 0.389 | 0.291 | 0.194 | 0.097 |
| 12 | S | 7313.462 | 5850.769 | 4388.077 | 2925.385 | 1462.692 |
| | σ | 0.000291 | 0.000233 | 0.000174 | 0.000116 | 581E−05 |
| | Expansion | 0.728 | 0.582 | 0.437 | 0.291 | 0.146 |
| 18 | S | 9028.261 | 7222.609 | 5416.957 | 3611.304 | 1805.652 |
| | σ | 0.000359 | 0.000287 | 0.000215 | 0.000144 | 7.18E−05 |
| | Expansion | 1.078 | 0.862 | 0.647 | 0.431 | 0.216 |
| 24 | S | 12508.33 | 10006.67 | 7505 | 5003.333 | 2501.667 |
| | σ | 0.000497 | 0.000398 | 0.000298 | 0.000199 | 9.94E−05 |
| | Expansion | 1.791 | 1.433 | 1.075 | 0.716 | 0.358 |
| 30 | S | 13759.38 | 11007.5 | 8255.625 | 5503.75 | 2751.875 |
| | σ | 0.000547 | 0.000438 | 0.000328 | 0.000219 | 0.000109 |
| | Expansion | 1.970 | 1.576 | 1.182 | 0.788 | 0.394 |

Figure 3:
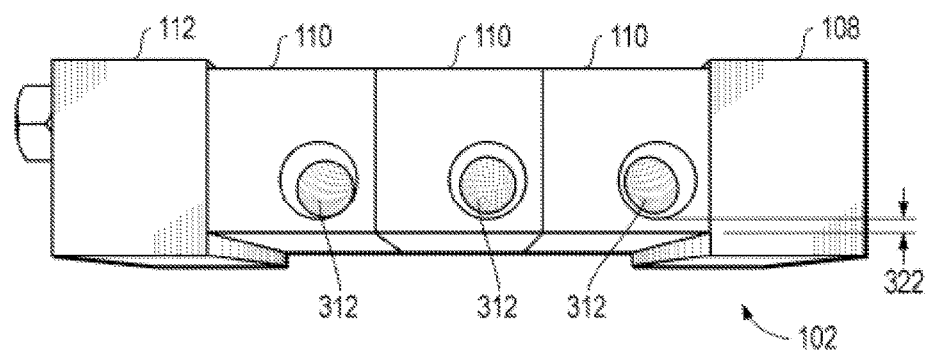
FIG. 3 is a side perspective view of the base plate of the divider block of FIG. 1.
Figure 4:
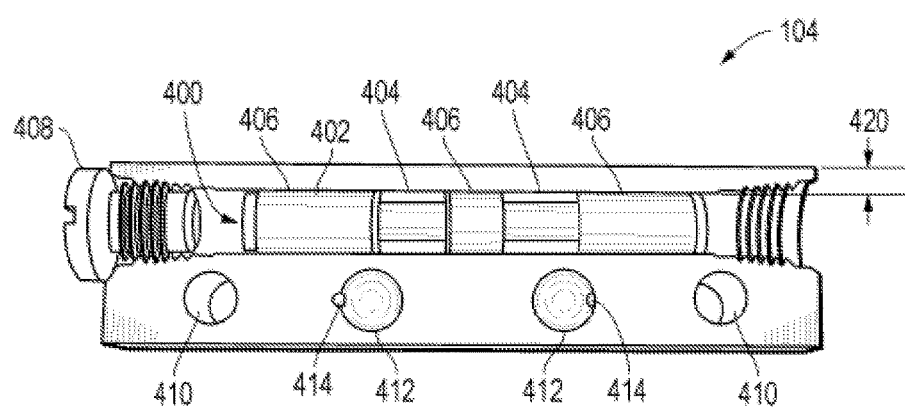
FIG. 4 is a cross-sectional view of a divider block section of the divider block of FIG. 1.
Figure 5:
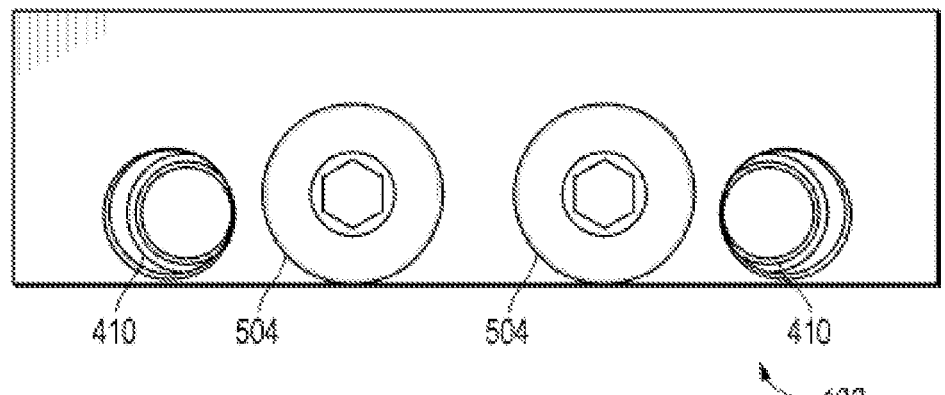
FIG. 5 is a front view of a divider block section of the divider block of FIG. 1.
Figure 6:
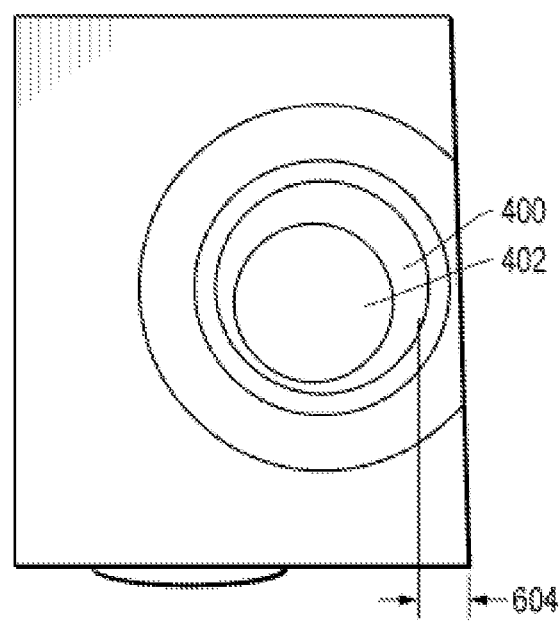
FIG. 6 is an end view of the divider block section of the divider block of FIG. 1.

FIGS. 3-6 illustrate some of the problem areas that applicant has discovered in a commercially available, prior art divider block assembly. FIG. 3 shows that the thickness 322 of intermediate base sections 110 at outlet ports 312 is not great. This thin area allows for deformation of the metal at high pressure, which allows fluid to pass around the piston and travel a path of least resistance. FIG. 4 shows that the thickness 420 of material above the bore 400 in the divider block section 104 is not great, and is susceptible to deformation at high pressures. FIG. 4 also shows the relatively thin areas between bore 404 and counterbored bolt holes 410 and between bore 404 and inspection ports 412. FIG. 5 shows that bolt holes 410 are not centered on the divider block surface to prevent interference with internal fluid channels. Off-centered bolts apply asymmetric forces to the seals between the divider block section 102 and intermediate base plate 110, and can be overtightened in an attempt to reduce leaks. Overtightening can cause the piston bore to deform. FIG. 6 shows that the thickness 604 of material on the side of the piston bore is relatively small.

The thin wall on the top of the piston shown in FIGS. 4 and 6 expands and distorts in high-pressure applications, making prior art divider blocks unsuitable for use at higher pressures. Because lubrication pressures have been increasing in recent years, the industry needs a divider block that accurately dispenses fluid at mid pressure (greater than about 1,000 psi) to high pressure service (greater than about 3500 psi).

Table 1 below shows calculated stress, strain, and expansion (deformation) of various divider block piston bores at different pressures. Table 2 shows the characteristics of each of the blocks in Table 1. The stress "S," strain "σ" and expansion were calculated as follows:

$$S = P*(ID+t)/2t,$$

TABLE 2

| Block Number | Inner Diameter of Piston Bore (inches) | Thinnest Wall Section (inches) | Temperature (Degrees F.) |
| --- | --- | --- | --- |
| 6 | 0.177 | 0.18 | 180 |
| 9 | 0.212 | 0.163 | 180 |
| 12 | 0.250 | 0.13 | 180 |
| 18 | 0.300 | 0.115 | 180 |
| 24 | 0.360 | 0.090 | 180 |
| 30 | 0.360 | 0.080 | 180 |

Table 1 shows, for example, that block number 30, which Table 2 shows as having an inner diameter of 0.360 in. and a minimum wall thickness of 0.080 in., will expand by 0.000118 in. at 3000 psi operating pressure and by 0.000197 in. at 5,000 psi. These expansions are a significant fraction of the piston clearance of 0.0003 in. and can significantly reduce dispensing accuracy. Having recognized that the equipment failure can be caused by inaccurate dispensing at middle to high pressures, a divider block of the present invention can be designed to reduce deformation and improve dispensing volume accuracy.

A preferred embodiment of the invention is capable of delivering accurate volumes of oil in high-pressure service, that is, at pressures greater than about 3,500 psi. Such a block resists significant deformation, that is, deformation that causes the accuracy of the block to vary from the nominal fluid volume by more than 15%. A preferred divider block reduces deformation to ensure an accuracy of better than 15% at pressures of about 3500 psi, more preferably better than 10% at 3500 psi, and most preferably better than 5% at 3500 psi. Such blocks also have improved accuracy at higher pressures, including 5,000 psi.

A preferred divider block capable of reliable operation in high pressure applications incorporates several changes and additions to the complete system. Not every embodiment of the invention necessarily includes all of the improvements described below.

Figure 7:
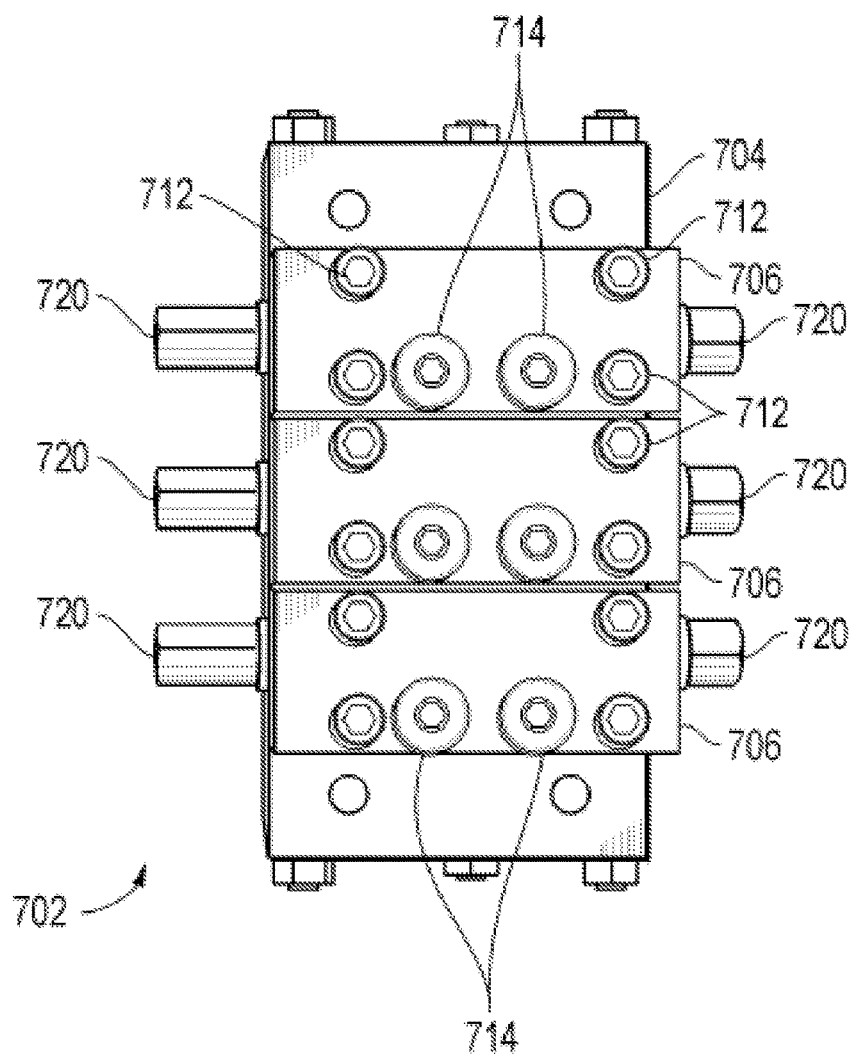
FIG. 7 is a front perspective view of a divider block embodying principles of the present invention.

FIG. 7 shows a preferred embodiment of the invention referred to as an XD ("extreme duty") divider block assembly 702. Preferred divider block assembly 702 includes a base plate 704 and three divider blocks sections 706. Each divider block section is preferably attached to the base plate 704 using 4 bolts 712, instead of two bolts like in prior art divider blocks. Using four bolts allows for a symmetric tightening force, while the bolt holes do not interfere with internal passages of the divider block section 706. Two plugs 714 for each divider block section 706 cover an inspection port. Check valves 720, preferably stainless steel poppet-type valves with integral tube connections, are attached to all fluid outlets.

Figure 8A:
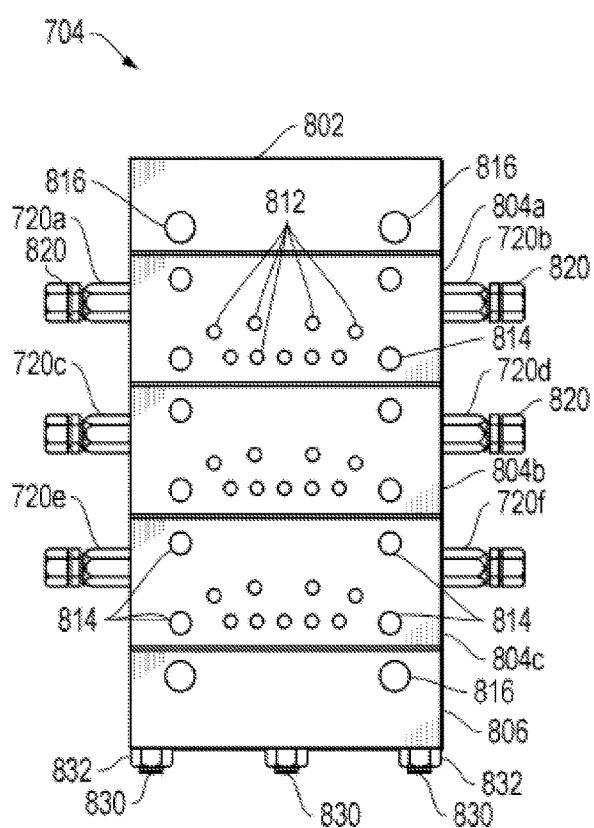
FIGS. 8A and 8B are, respectively, a front view and a side view of a base plate used with the divider block of FIG. 7.
Figure 8B:
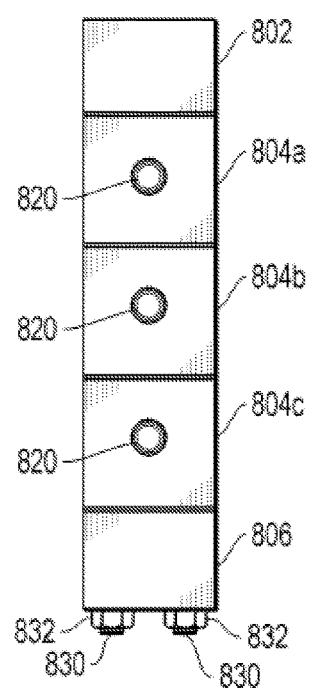

FIGS. 8A and 8B show a front view and a side view, respectively, of preferred base plate 704 without divider blocks sections 706 mounted thereon. Base plate 704 includes an inlet section 802, an end section 806, and three intermediate base plate sections 804a, 804b, and 804c, on which three divider blocks sections (not shown) can be mounted. Holes 812 pass fluid between intermediate base plate sections 804 and the corresponding divider block section 706. Threaded bolt holes 814 accept bolts for attaching divider block sections 706. Holes 816 are for mounting the complete divider block assembly.

Attached to balancing valves 720a-720f are tubing connectors 820 for tubing that delivers the lubricant to a point of use or subsequent divider block. The multiple sections of the base plate 704 are preferably assembled using three tie rod bolts 830 (also referred to as manifold bolts) and nuts 832. Tie rod bolts 830 are preferably 0.313 in. or larger in diameter and heat-treated. Proper torque is applied to the base plate manifold bolts to ensure that the bolts are sufficiently tight to resist deformation and flexing from the high pressure and to ensure an even force on the o-rings (not shown) between the sections of the base plate for proper sealing to prevent leaking. The larger, heat-treated tie rod bolts resist deformation under the extra torque applied when tightening them. The proper torque ensures the bolts are stretched to factory specifications during assembly and will not detrimentally expand after the system is installed on the compressor or piece of machinery when temperatures and pressures are elevated. While the invention could be used with the prior art-type threaded insert that fasten each section to the adjacent section, the use of longer bolts that hold the entire assembly together allows for uniform tightening, and eliminates the problem of stripping threads which occurs with the prior art threaded inserts.

O-rings (not shown) are positioned between all the base plate sections and between the check valves 720a-720f and their respective intermediate base plate sections 804a-804c. O-rings are preferably made of 90 durometer, peroxide-cured Viton, which resists becoming brittle in high temperature applications and is compatible with synthetic and mineral based oils. Additional intermediate base plate sections 804 can be added, along with additional divider block sections 706, as needed to provide additional fluid outlets.

Figure 9A:
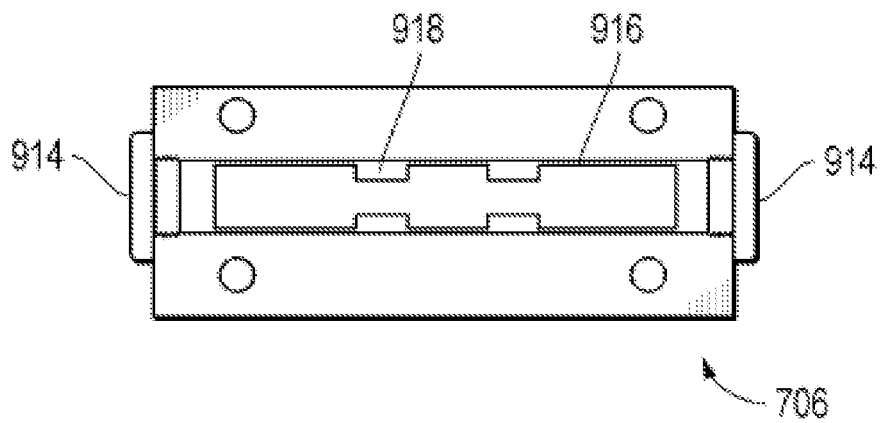
FIGS. 9A, 9B, and 9C are, respectively, a sectional view, a front view, and an end view of a divider block section of the divider block assembly of FIG. 7.
Figure 9B:
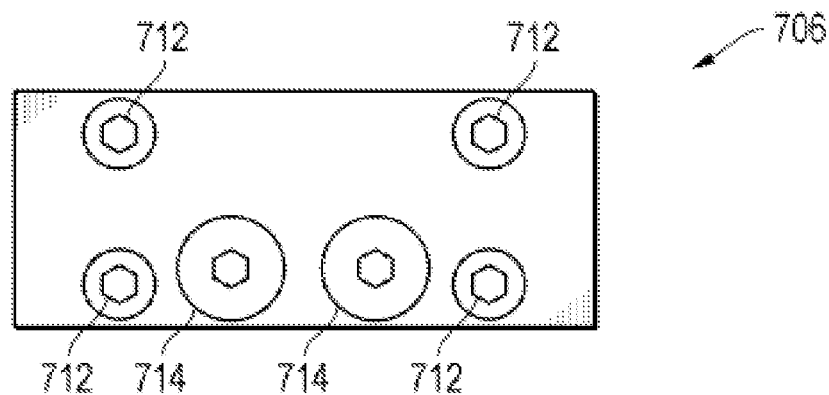
Figure 9C:
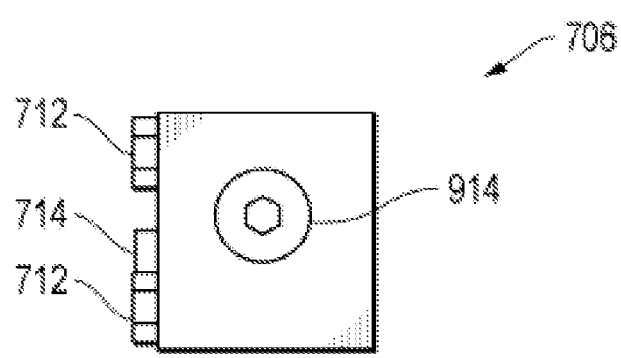

FIGS. 9A, 9B, and 9C show divider block section 706 in more detail. FIG. 9A shows a front sectional view, FIG. 9B shows a front view, and FIG. 9C shows a side view. FIG. 9A shows a piston 916 within a piston bore 918 sealed by piston enclosure plugs 914. FIGS. 9A-9C show that divider block section 706 is designed with sufficient metal surrounding the piston bore 918 to eliminate the flexing and distortion when operating under high pressures. FIG. 9C shows that, in one embodiment, the heads of bolts 712 are flush with the surface of divider block section 706, that is, in this embodiment divider block section 706 does not include counterbores for recessing mounting bolts 712, thereby avoiding a reduction in thickness of material around bore 918. While this adds to the overall thickness of diver block assembly 702, applicant has found that the additional thickness is acceptable to produce a more accurate divider block and prevent distortion of the bore from over-tightening.

In prior art counterbores, the bottom of the counterbore is located above the piston bore. Skilled persons have failed to recognize that as the mounting bolt is tightened, the piston bore is squeezed between the bottom of the counterbore and the base plate and can distort, which in turn causes metering inaccuracy and eventual divider valve failure. In an alternative embodiment of the invention, the divider block includes counterbores for recessing the mounting bolts, with the counterbores being sufficiently deep to minimize or eliminate distortion of the piston bore.

Figure 13:
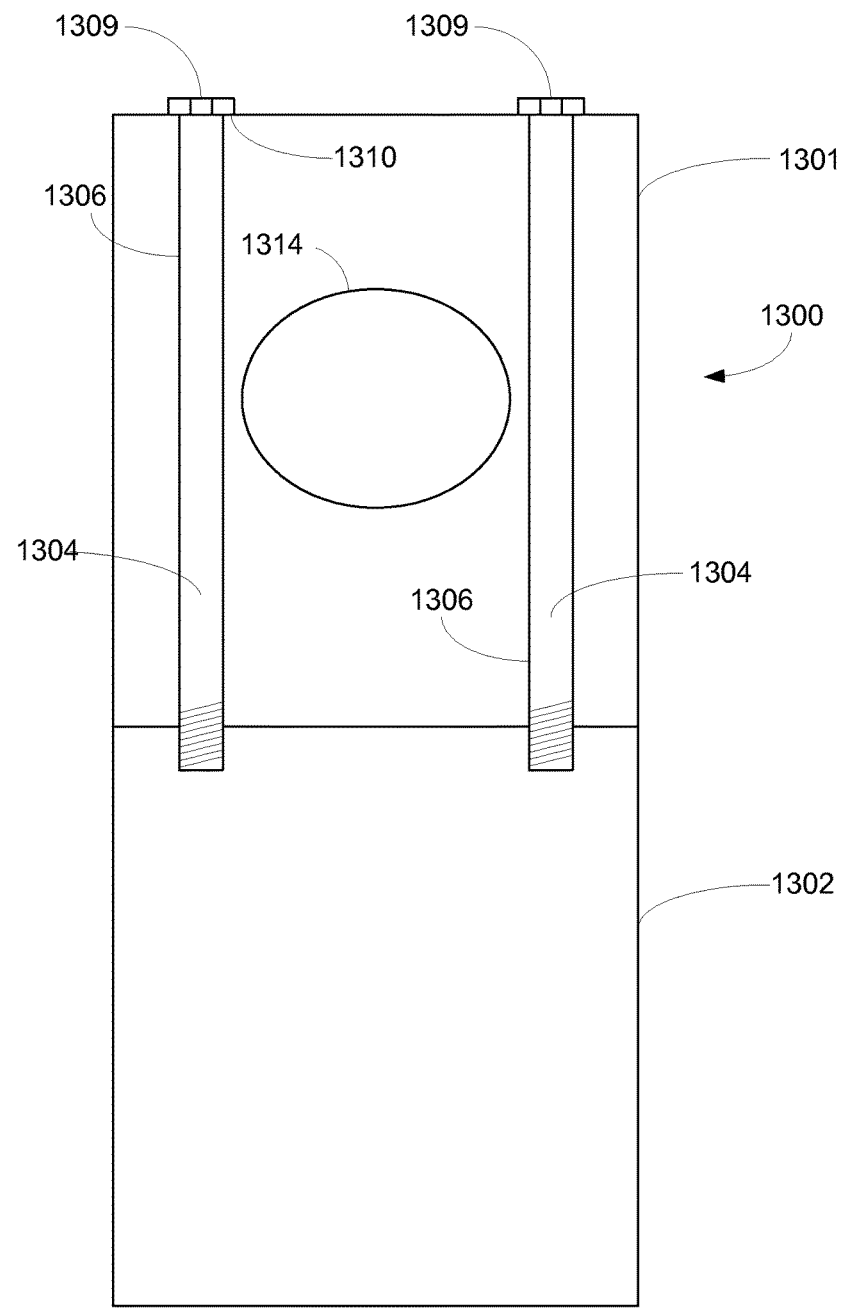
FIG. 13 is a cross-sectional view of a divider block section of FIG. 9C.

FIG. 13 shows a cutaway view of a divider block 1302 mounted to base plate 1302. Bolt 1304 extends through mounting bore 1306 of divider block 1302 and threads into base plate 1308. Sealing torque is applied to bolts 1304 to draw the sealing surfaces of divider block 1302 and base plate 1308 together. The upper surface 1310 of divider block 1300 provides a shoulder that head 1306 of bolt 1304 can engage to provide sealing pressure against base plate 1312. When two bolts on both sides of the piston bore are used, as shown in FIG. 13, the piston bore distortion is less than the distortion of typical divider blocks in which only two bolts on one side of the piston bore are used. Excessive torque is applied to bolts 1304, however, may cause piston bore 1314 to distort because as bolts 1304 are tightened. The distortion of piston bore 1314 is shown exaggerated in FIG. 13 for illustration.

Applicant has recognized that a sufficiently deep counterbored hole allows a mounting bolt to apply the sealing pressure well below the divider block surface, which can reduce or eliminate the compressive force on the metal around the piston bore, thereby reducing or eliminating distortion of the piston bore of the divider block. Distortion is preferably minimized so that the volume of fluid dispensed is accurate to within 15% at 3500 psi even if excessive torque was applied to the bolts.

Figure 14:
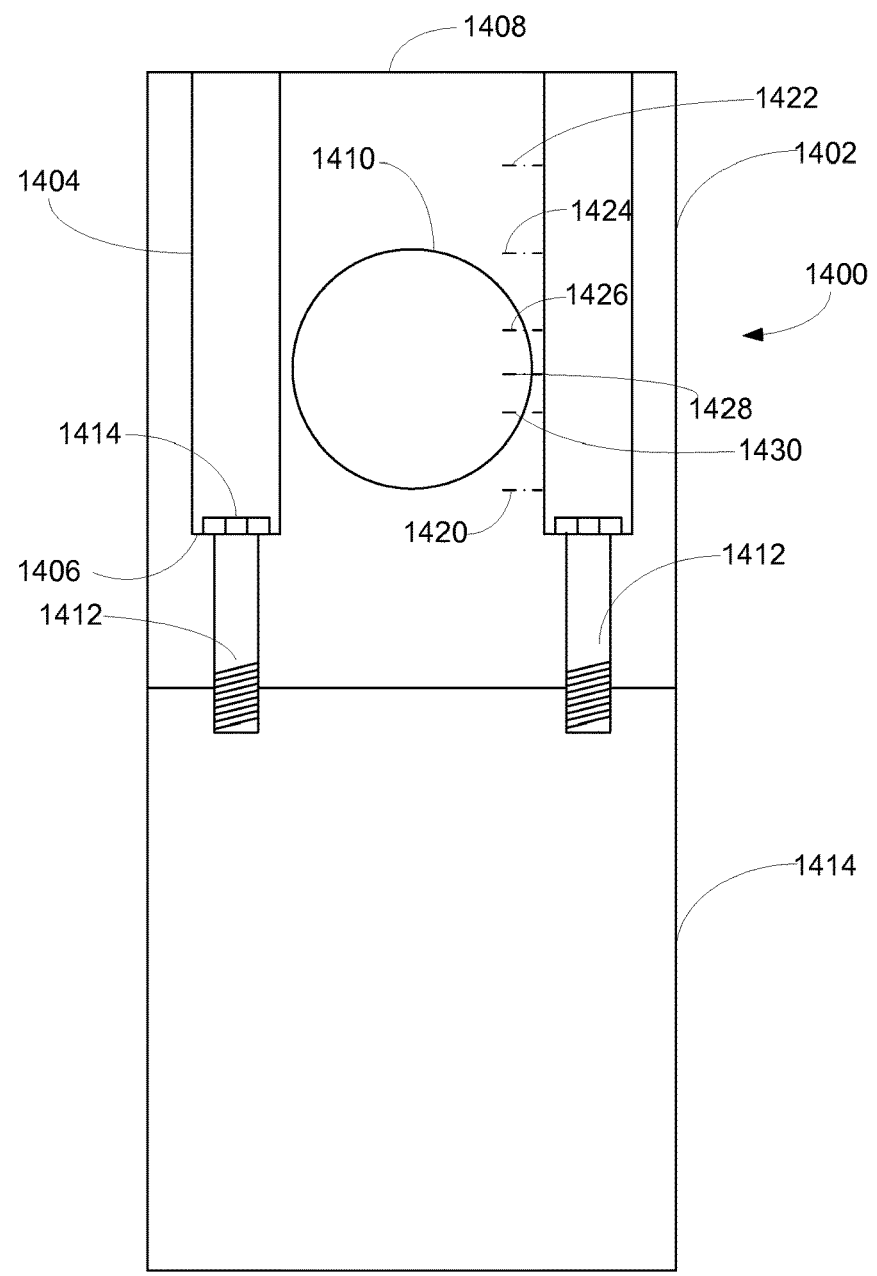
FIG. 14 is a cross section of a divider block that includes counterbores that extend sufficiently deep into the divider block section to eliminate distortion of the piston bore.

As shown in FIG. 14, a divider block 1402 includes counterbores 1404 that provide shoulders 1406 further from the top surface 1408 of divider block 1402 than the prior art counterbore shoulders shown in FIG. 5. The counterbore shoulders 1406 are sufficiently below upper surface 1408 to reduce or eliminate pressure on a piston bore 1410 and thereby prevent distortion when bolts 1412 are tightened, or even over tightened, to seal the divider block 1402 against a base plate 1414. In a preferred embodiment, the piston bores do not distort when the fasteners are overtightened by 10%, 20%, 25%, 50% or 100% of the recommended torque, which torque will depend on the size of the bolts.

In the embodiment of FIG. 14, counterbore shoulders 1406 are below the lowermost edge of the piston bore 1400, that is, below the depth indicated by line 1420. In other embodiments, the counterbores do not extend that far. For example, in some embodiments, the counterbores extend at least half the distance between the top of the divider block section and the top of the piston bore, that is, below the depth indicated by line 1422. In other embodiments, the counterbore extends at least the distance between the top surface of the divider block and the top of the piston bore, that is, at least to the depth indicated by line 1424. In still other embodiments, the counterbore extends into the divider block section to a depth past the depth (indicated by line 1426) of a point ⅓ of the distance from the top of the piston bore to the bottom of the piston bore, past the depth (indicated by line 1428) of the midpoint of the piston bore, or past the depth (indicated by line 1430) of a point ⅔ of the distance from the top of the piston bore to the bottom of the piston bore. When describing the depth of the counterbore to which the counter extends or, equivalently, the position of the shoulder of the counterbore, relative to the piston bore, it will be understood that the counterbore extends next to, and not into, the piston bore and that there is sufficient metal between the piston bore and the counterbore to prevent distortion by the fluid pressure.

Because the mounting pressure or force is applied from the level of the counterbore shoulder 1406, when the shoulder is sufficiently below the surface so that much of the compressive force bypasses the piston bore, the piston bore 1410 experiences little or no distortion caused by the mounting force from bolt heads 1414.

Figure 10:
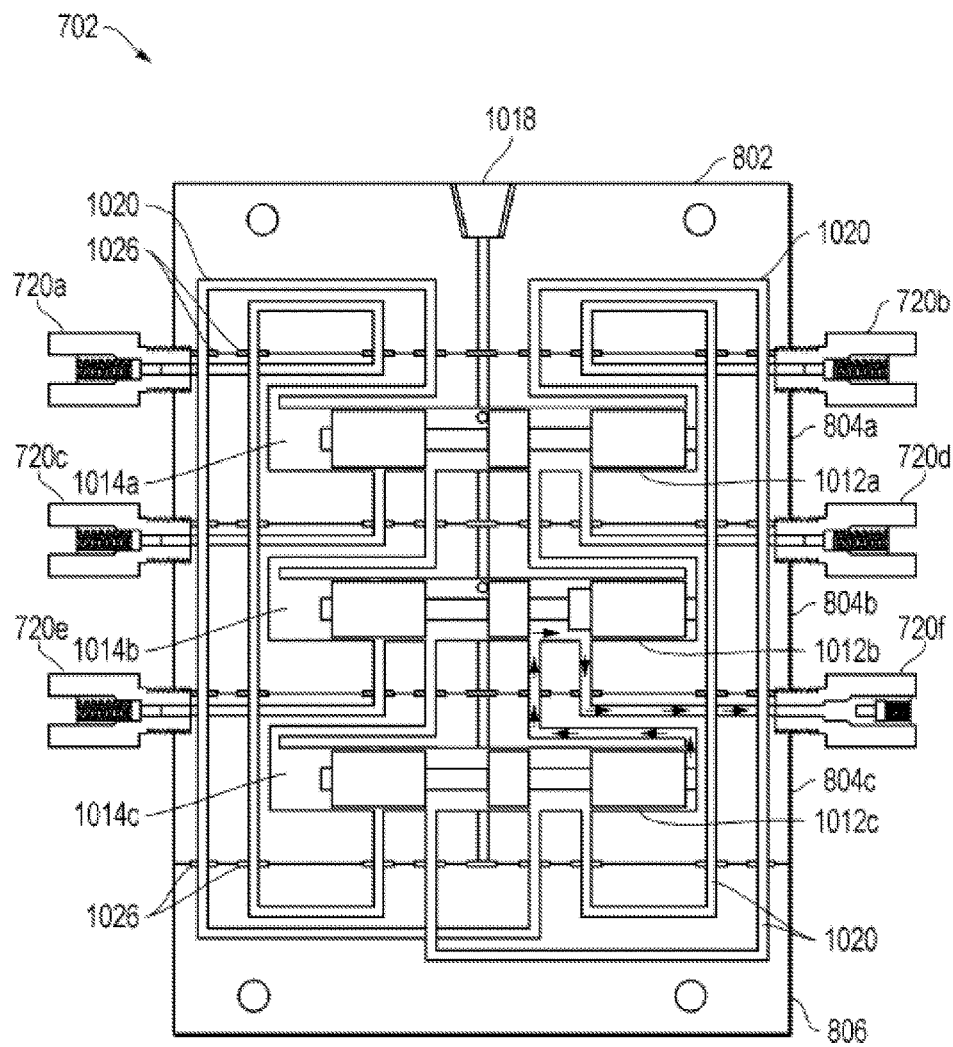
FIG. 10 shows schematically the fluid flow within the divider block of FIG. 7 during one part of its cycle.
Figure 11:
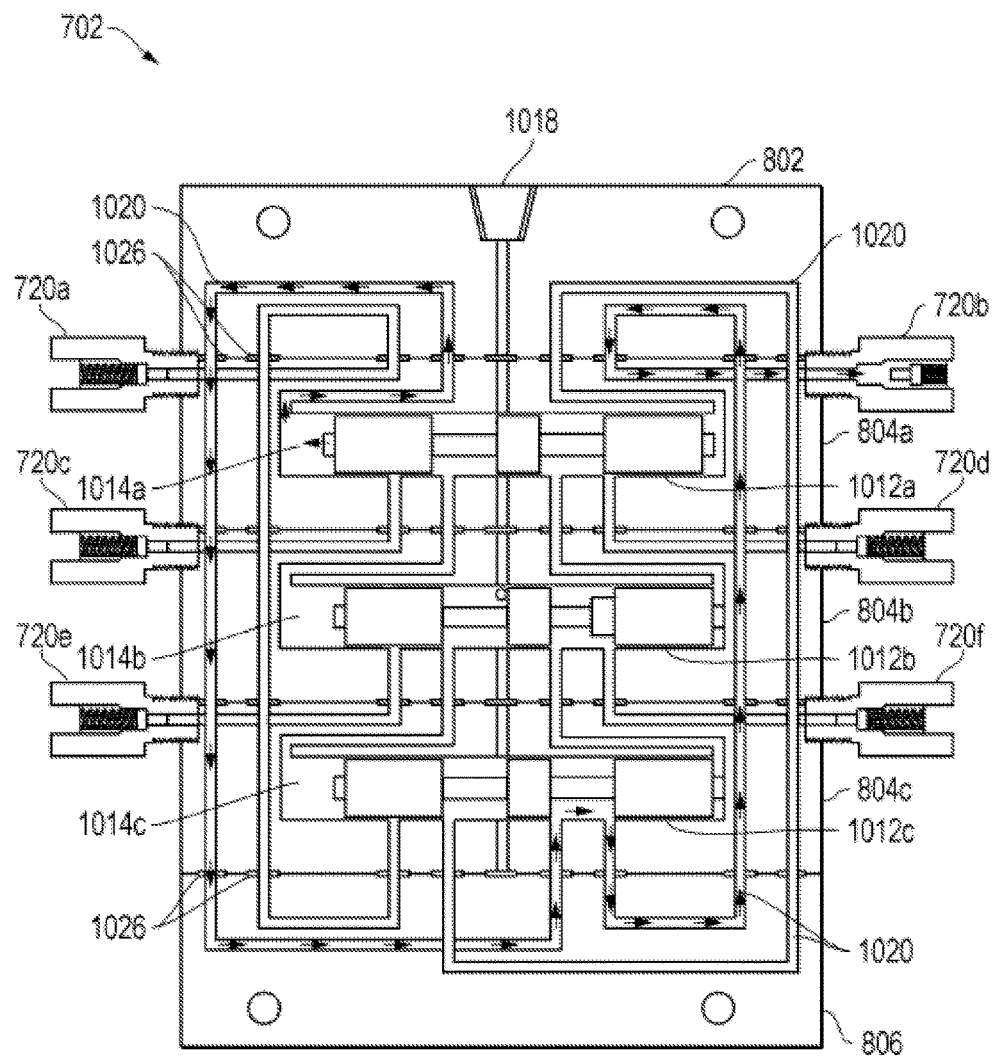
FIG. 11 shows schematically the fluid flow within the divider block of FIG. 7 during a part of its cycle following the part shown in FIG. 10.

FIGS. 10 and 11 show schematically how divider block assembly 702 functions. FIG. 10 shows internal passages 1020 in the input section 802, the three intermediate sections 804a, 804b, and 804c, and the end section 806. Within intermediate sections 804a, 804b, and 804c are three pistons 1012a, 1012b, and 1012c within three piston bores 1014a, 1014b, and 1014c. The lubricant enters divider block 702 at inlet 1018 in input section 802 and causes pistons 1012a, 1012b and 1012c to move back and forth, opening and closing passages, and causes the lubricant to flow through fluid channels 1020 to outlet check valves 720a-720f. O-rings 1026 seal the fluid within the channels 1020 as the channels 1020 pass between the sections, which are held together by bolts as shown in FIG. 8.

In the piston positions shown in FIG. 10, piston 1012c has just finished forcing a volume of fluid through check valve 720f, and the channels are now set for piston 1012a to push fluid out through a channel to check valve 720b as shown in FIG. 11. The design of the fluid paths in divider blocks is well known. The volume of fluid dispensed can be determined from the cross sectional area of the bore and the distance traveled by the piston 1012c as it pushes the fluid.

Figures 12A, 12B:
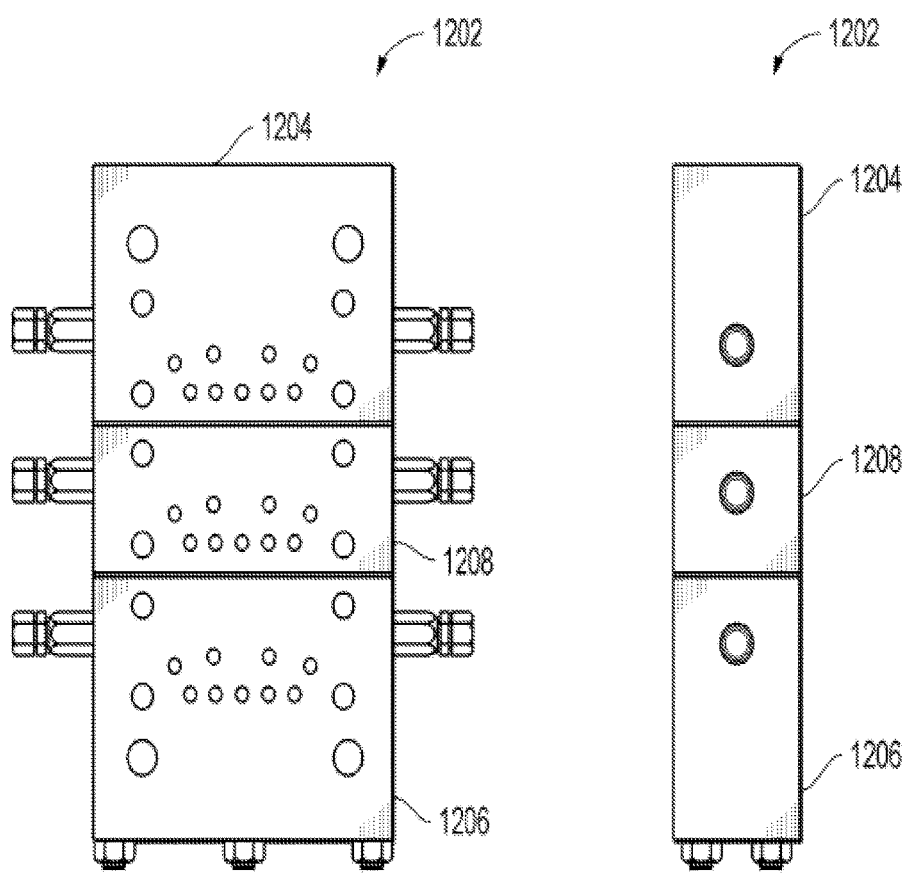
FIGS. 12A and 12B are, respectively, a front view and a side view of an alternative embodiment of a base plate used with the divider block of FIG. 7.

FIG. 12A is a front view and FIG. 12B is a side view of an alternative embodiment for base plate 1202 for use with divider block assembly 702. Base plate 1202 includes an inlet section 1204, an end section 1206, and an intermediate base plate 1208. Inlet section 1204 includes an integral intermediate base plate section for mounting a divider block section 706. Similarly, end section 1206 includes an integral intermediate base plate section for mounting a divider block section 706. Thus, base plate 1202 includes only three base components, yet accommodates three divider block sections 706. By eliminating two base sections compared to the embodiment of FIGS. 8A and 8B, this embodiment reduces the number of fluid connections and therefore reduces the possibility of leaks. Additional intermediate base plate sections 1208 can be added, along with additional divider block sections 706, as needed to provide additional fluid outlets.

Applicant has discovered several problems that make prior art divider blocks unsuitable for use at high pressures. The preferred embodiments of the invention described above address these concerns. One problem is that piston bore walls are too thin in places, which allows the walls to deform under fluid pressure. Another problem is caused by inadequate fastener designs, such as too few mounting bolts or weak tie rods used to assemble the divider block components. The divider block must be assembled tightly to prevent leakage between the components. Users try to compensate for an inadequate design by overtightening the fasteners to prevent leaks, and the overtightening can deform the piston bore. Yet another problem is the failure to balance the output pressures of the divider block. Each of these problems and some preferred solutions are described in more detail below.

A preferred divider block assembly, such as that shown in FIG. 7, includes a balancing check valve at each working outlet to prevent oil, gas, and/or air from backflowing into the divider block system and to balance the pressure at the different outlets. In some applications, the balancing check valves can use Viton sealing elastomers in the form of a poppet seal (poppet check valve). In high temperature applications, the valve can use a metal-to-metal seal, such as a stainless steel ball seated against a machined sealing surface. The design of a preferred base plate outlet includes an integral check valve, that is, a check valve that is part of the divider block design, as opposed to prior art designs in which check valves were optional accessories. For example, one preferred base plate is designed with non-pipe threads and o-ring sealed outlets. These outlets accommodate an o-ring sealing check valve, and the non-pipe threads prevent users from using thread sealing products such as Teflon tape or thread sealing liquids which may cause problems if introduced into the hydraulic circuit.

Add-on balancing valves have been available as a relatively expensive option on divider blocks, and balancing valves were considered by many to be unnecessary on lower pressure systems. Applicant has found that in many instances, a divider block system does not function reliably in applications with pressures over 800 psi without the use of the balancing valves, particularly in applications in which the output pressure varies greatly, that is, by more than 800 psi or 1000 psi. In applications where there is excessive pressure on several of the lubrication points, there is preferably a balancing valve on every outlet that has a lower working pressure to ensure the system is balanced with equal pressures on each outlet.

Without balancing valves, when the system distributes lubrication from an outlet at, for example, at 2000 psi, then progressively changes to an outlet at 100 psi. The pressure can cause the piston in the low-pressure piston bore to move too rapidly and contact the end plugs on the divider block, causing deformation of the piston and premature failure of the divider block. Lack of the balancing valve can also cause oil to leak past the divider block piston to a lower pressure path. When this occurs, the lubrication point of higher pressure does not receive the needed quantity of oil, which in turn causes premature wear or failure of compressor or machinery components.

A preferred divider block, therefore, includes integral balancing valves that can incorporate a variety of springs to keep the poppet or ball closed when oil is not being injected through the outlet. An appropriate spring is chosen to balance the pressure in each outlet to reduce pressure differentials within the divider valve assembly. For example, if the divider block system's maximum operating pressure at any outlet is 1800 psi, balancing check valves should be installed on all outlets of the system so that each outlet requires a pressure of 1800 psi to open the valve. For example, if the outlet pressure at one outlet were 600 psi, a spring would be installed to provide an additional cracking pressure of 1200 psi so that a total of 1800 psi would be required to open the outlet valve. This system will then be correctly balanced, and all outlets will see the same pressure, 1,800 psi. Because the design of a preferred base plate intermediate section requires a check valve at the exit, the user only needs to choose a spring of the appropriate stiffness to place in each balancing valve, and little or no additional cost is incurred to balance the system. Also, incorporating check valves with tube connections into the design of the divider block assembly eliminates additional leak paths in the system caused by adding the balancing valves.

An inadequate fastener design is another problem of prior art divider blocks that is addressed by some embodiments of the present invention. Prior art industry standard divider blocks attached to the base plate with only two screws, and applicant has found that the mounting screws can easily be over tightened and cause distortion to the divider block bore. Egg-shaped distortion of the piston bore causes the piston to put excessive pressure against the back and front of the divider block bore which in turn causes the divider block to wear and fail prematurely. When the divider block mounting screws are over-tightened, the piston in the bore cannot move freely, the system pressure becomes elevated and the piston-to-bore clearance is compromised causing the system to fail prematurely, creating wear or failure to the compressor or machinery components. If the lubrication system incorporates a pressure gauge, the operator can detect the elevated pressure, but 85% of compressor lube systems are installed without a pressure gauge. A preferred divider block of the invention is designed to mount on the base plate with four mounting screws to evenly distribute the force needed to hold the divider block in a stable position with equal force spread evenly across the block, thereby eliminating the problems with distortion of the block and ensuring all o-ring seals between the divider block and base plate are compressed equally for reliable sealing. A preferred embodiment also includes larger, heat-treated tie rods to assemble the base plate sections. Such tie rods maintain an adequate torque over time without initial overtightening.

The invention has broad applicability and can provide many benefits as described and shown in the examples above. The embodiments will vary greatly depending upon the specific application, and not every embodiment will provide all of the benefits and meet all of the objectives that are achievable by the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A divider block assembly for distributing a low volume of a lubricant at high pressure, the divider block being operated by the pressure of the lubricant being dispensed, comprising:

a base plate including an inlet section, an end section, and one or more intermediate base sections, each intermediate base section including a lubricant outlet comprising a balancing check valve and a connector downstream of the balancing check valve, the base plate being assembled from multiple section using one or more fasteners, wherein the balancing check valve is configured to balance a pressure at which lubricant is discharged from the divider block assembly at each of the lubricant outlets and inhibit reverse flow of lubricant at each of the lubricant outlets;

one or more divider block sections mounted on the one or more intermediate base sections, each divider block section having a piston bore for receiving a piston, a piston, and an outlet passage for lubricant dispensed by the piston as it is moved by the pressure of the incoming fluid, each divider block section having multiple counterbored mounting holes for receiving a fastener, each of the one or more counterbored mounting holes having a shoulder positioned below a bottom surface of the piston bore to prevent distortion of the piston bore when the fasteners are tightened to seal the divider block to the base plate, the position of the shoulder reducing distortion of the piston bore by reducing the compressive force on the metal around the piston bore.

2. The divider block assembly of claim 1 in which distortion of the piston bore is minimized such that the volume of lubricant dispenses at 3500 psi is accurate to within 15%.

3. The divider block assembly of claim 1 in which each divider block section is attached to a corresponding intermediate base section by four threaded fasteners, two on either side of the piston bore.

4. The divider block assembly of claim 1 in which each divider block section is attached to a corresponding intermediate base section by two threaded fasteners.

5. The divider block assembly of claim 1 in which the counterbore extends sufficiently into the divider block section to prevent distortion of the piston bore when the fasteners are tightened to a torque 20% greater than a recommended torque.

6. The divider block assembly claim 5 in which the counterbore extends sufficiently into the divider block section to prevent distortion of the piston bore when the fasteners are tightened to a torque 50% greater than a recommended torque.

7. The divider block assembly of claim 1 in which the piston bore is approximately centered between the long sides of the divider block that are normal to the surface of the divider block section having holes for passing liquid to a base plate.

8. A divider block section for use at high lubricant pressures, operated by the pressure of the lubricant being dispensed, and having a piston bore for receiving a piston, a piston, and a lubricant passage to dispense lubricant pushed by the piston as it is moved by the pressure of an incoming lubricant wherein the lubricant passage terminates at a balancing check valve configured to balance a pressure at which the lubricant discharges and a connector, the divider block section having counterbored holes for receiving fasteners for attaching the divider block to an intermediate base section, the counterbore extending from the surface to a depth below a bottom of the piston bore, the counterbore reducing distortion of the piston bore by reducing the compressive force on the metal around the piston bore.

9. The divider block section of claim 8 in which the piston bore is approximately centered between the long sides of the divider block that are normal to the surface of the divider block section having holes for passing liquid to a base plate.

10. The divider block section of claim 8 in which the divider block section includes mounting holes four threaded fasteners, two on either side of the piston bore.

11. The divider block section of claim 8 in which the shoulder of the counterbore is sufficiently far from the surface to prevent distortion of the piston bore when the fasteners are tightened to a torque 50% greater than a recommended torque.

12. A method of assembling a divider block assembly for distributing a low volume of a lubricant at high pressure, the divider block assembly including a divider block section and a base plate, the divider block assembly being operated by the pressure of the lubricant being dispensed, the divider block section having a piston bore for receiving a piston, a piston, and a lubricant passage to dispense lubricant pushed by the piston as it is moved by the pressure of an incoming lubricant, the method comprising:

providing a divider block assembly kit including a divider block section and a base plate, the divider block assembly being operated by the pressure of the lubricant being dispensed, the divider block section having a piston bore for receiving a piston, a piston, and a lubricant passage to dispense lubricant pushed by the piston as it is moved by the pressure of an incoming lubricant wherein the lubricant passage has an outlet with a balancing check valve and connector wherein the balancing check valve balances a discharge pressure of the dispensed lubricant;

juxtaposing the divider block section and the base plate;

inserting mounting fasteners into counterbored mounting holes in the divider block section, the counterbores extending to a depth below a bottom of the piston bore; and tightening the fasteners to secure the divider block section to the base plate.

* * * * *